United States Patent [19]

Mayurnik et al.

[11] Patent Number: 5,006,326
[45] Date of Patent: Apr. 9, 1991

[54] GASEOUS GENERATOR SYSTEM FOR PREPARING CHLORINE DIOXIDE

[75] Inventors: George Mayurnik, Franklin Lakes, N.J.; Donald C. Kucher, Quakertown, Pa.

[73] Assignee: International Dioxcide, Inc., Clark, N.J.

[21] Appl. No.: 346,451

[22] Filed: May 2, 1989

[51] Int. Cl.$^5$ .............................................. C01B 11/02
[52] U.S. Cl. ......................................................... 423/477
[58] Field of Search ................. 423/477, 478, 479, 480

[56] References Cited

U.S. PATENT DOCUMENTS 3,123,521  3/1964  Wentworth et al. .

FOREIGN PATENT DOCUMENTS

| 779202 | 2/1968 | Canada | 423/477 |
| 2730883 | 1/1979 | Fed. Rep. of Germany | 423/477 |
| 1157012 | 5/1985 | U.S.S.R. | 423/480 |

OTHER PUBLICATIONS

Chemical Abstracts, 90:154270h, "Aqueous Chlorine Dioxide Solutions", Lehmann, W., 1/04/79.

*Primary Examiner*—Michael L. Lewis
*Assistant Examiner*—Brian M. Bolam
*Attorney, Agent, or Firm*—Burns, Doane, Swecker & Mathis

[57] ABSTRACT

Provided is a process for preparing a gaseous stream of chlorine dioxide. The process comprises first providing an aqueous stream of chlorine dioxide. The chlorine dioxide stream can be provided, for example, by reacting an alkali metal chlorite such as sodium chlorite with an alkali metal hypochlorite such as sodium hypochlorite and an inorganic acid such as hydrochloric acid, or by reacting chlorine gas and an alkali metal chlorite such as sodium chlorite. The resulting aqueous stream is then contacted in countercurrent fashion with a stream of inert gas or air, resulting in chlorine dioxide being stripped from the aqueous stream. A chlorine dioxide containing gaseous stream is then recovered, which is suitable for further use. The process thereby safely and efficiently generates a gaseous stream of chlorine dioxide for subsequent use.

9 Claims, 2 Drawing Sheets

GASEOUS GENERATOR SYSTEM FOR PREPARING CHLORINE DIOXIDE

BACKGROUND OF THE INVENTION

The present invention relates to the production of a stream of chlorine dioxide. More particularly, the present invention relates to a process for efficiently generating a gaseous stream of chlorine dioxide, which stream is preferably essentially free of chlorine and inorganic salts.

Chlorine dioxide is utilized in a variety of processes including a large number of bacteriocidal applications, especially in the fields of decolorization, water treatment and odor abatement. Its usage is continuing to grow for many reasons. Due to the unstable nature of gaseous chlorine dioxide when compressed, however, it is necessary to produce chlorine dioxide on site rather than to produce it at a plant and ship it for usage when needed.

Many different methods and systems can be and have been used in the production of chlorine dioxide. For example, chlorine dioxide can be produced by the reduction of a chlorate salt by a chloride salt in an acidic medium. The chlorate salt is generally sodium chlorate, and the chloride salt is generally sodium chloride. Operable acids include hydrochloric acid, perchloric acid, phosphoric acid, and sulfuric acid. See, for example, U.S. Pat. Nos. 4,137,296 and 3,733,395. In the production of chlorine dioxide from chlorate, however, large amounts of chlorine are also generated. This chlorine must generally be removed from the product downstream of the reaction in order to provide a usable product.

The production of chlorine dioxide from chlorite is also well known. For example, see German Patent No. 1,467,024. Therein, sodium chlorite is reacted with a chlorine solution to provide chlorine dioxide product. A by-product of the reaction is an inorganic salt, i.e., sodium chloride. Removal of the inorganic salt from the chlorine dioxide product is generally required before any subsequent use of the chlorine dioxide, which removal can be costly and inefficient.

The generation of chlorine dioxide is generally carried out in an aqueous stream, thereby providing a chlorine dioxide solution as the product. If the reaction product is in the form of a gas, the chlorine dioxide is ultimately placed in solution. See, for example, U.S. Pat. No. 4,137,296. Yet, there are occasions when it would be most beneficial to employ and/or administer the chlorine dioxide as a gaseous stream. Because of the problems which can arise due to the explosiveness of chlorine dioxide in air, however, chlorine dioxide has generally been produced and maintained in an aqueous solution as a safeguard. A method and system which would allow one to generate a gaseous stream of chlorine dioxide ($ClO_2$) in an efficient and safe manner would certainly be of great benefit to the industry. Moreover, the generation of a clean chlorine dioxide gaseous stream, i.e., a gaseous chlorine dioxide stream free of chlorine, acids, inorganic salts or any chlorite ion, would be particularly beneficial, as such a clean gaseous stream would be eligible for many additional applications.

Accordingly, it is an object of the present invention to provide a method for efficiently and safely generating a gaseous stream of chlorine dioxide for subsequent utilization and application.

It is another object of the present invention to provide an efficient method for generating a gaseous stream of chlorine dioxide, which stream of chlorine dioxide is substantially clean. More specifically, the gaseous stream of chlorine dioxide would be substantially free of chlorine, inorganic salts, chlorite ion and acids.

Yet another object of the present invention is to provide a method and system for generating a clean gaseous stream of chloride dioxide which is simple and efficient, yet safe.

These and other objects, as well as the scope, nature and utilization of the invention, will become apparent to those skilled in the art from the following description, the drawing, and the appended claims.

SUMMARY OF THE INVENTION

In accordance with the foregoing objects, there is provided a process for efficiently and safely generating a gaseous stream of chloride dioxide. The process involves providing an aqueous stream of chlorine dioxide, and then contacting the aqueous stream of chlorine dioxide with an inert gas stream or air stream in countercurrent fashion to strip the chlorine dioxide from the aqueous stream and thereby produce a gaseous stream of chlorine dioxide. The amount of inert gas used to strip the chlorine dioxide from the aqueous stream is controlled so that sufficient air is provided to strip the maximum amount of chlorine dioxide from the solution. The solution concentration is closely controlled, however, so that the resulting gaseous stream of chlorine dioxide contains a safe amount of chlorine dioxide, e.g., about 5 to 7% $ClO_2$ or less.

In a preferred embodiment, the aqueous stream of chlorine dioxide is generated by reacting chlorine gas and an alkali metal chlorite. Sodium chlorite is the preferred alkali metal chlorite for such a reaction.

In another preferred embodiment, the process involves preparing an aqueous stream of chlorine dioxide which is essentially free of chlorine by reacting sodium chlorite with sodium hypochlorite and an inorganic acid. The resulting aqueous stream is then contacted in countercurrent fashion with a stream of inert gas or air to thereby strip the chlorine dioxide from the aqueous stream and create a gaseous stream which is comprised of chlorine dioxide. This product gaseous stream of chlorine dioxide is essentially free of chlorine and any inorganic salts, as well as any acid or chlorite ion.

The process of the present invention thereby allows one to safely, yet efficiently, generate a gaseous stream of chlorine dioxide. The gaseous stream is also preferably essentially free of chlorine and any inorganic salts, as well as any acids or chlorite ion. The essentially clean chlorine dioxide gas stream can be generated directly on site. The resulting chlorine dioxide gaseous stream can then be employed in any suitable application, e.g., the decolorization and deodorization of fats and oils.

DETAILED DESCRIPTION OF THE PREFERRED EMBODIMENTS

Figure 1:
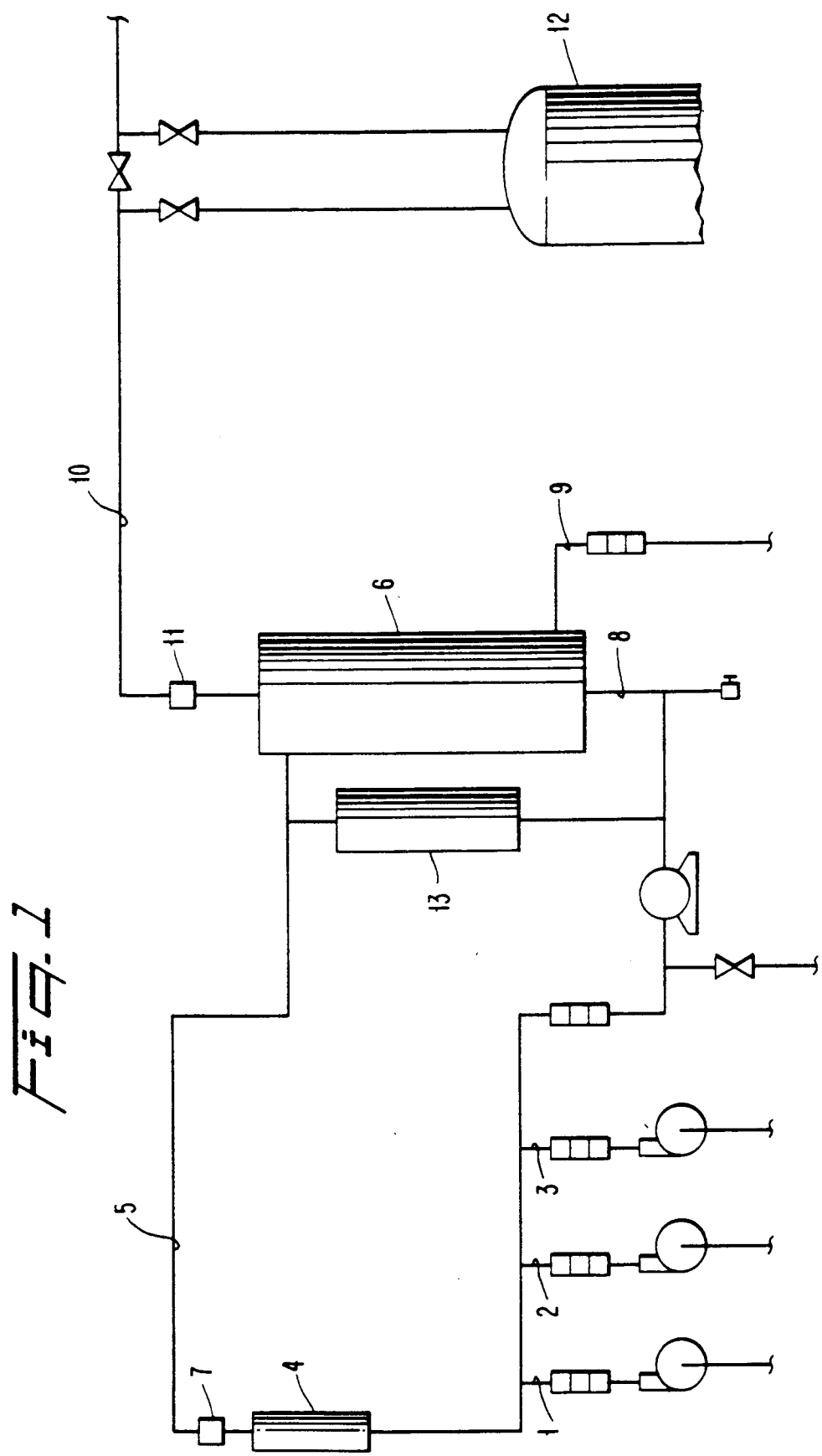
FIG. 1 of the Drawing schematically depicts a system useful in the practice of the present invention, wherein chlorite, hypochlorite and inorganic acid reactants are used to generate an aqueous stream of chlorine dioxide.

In the process of the present invention, an aqueous stream of chlorine dioxide is first provided. In general, the method used in generating the aqueous stream of chlorine dioxide can be any of the conventional, well known methods. Two preferred embodiments involve a reaction of sodium chlorite and chlorine, and a reaction of sodium chlorite, sodium hypochlorite and acid.

More specifically, in one preferred embodiment, the aqueous stream of chlorine dioxide is prepared by reacting an alkali metal chlorite, preferably sodium chlorite, with an alkali metal hypochlorite, preferably sodium hypochlorite, and an inorganic acid. The inorganic acid is preferably hydrochloric acid or sulfuric acid, with hydrochloric acid being the most preferred. The product of a reaction of sodium chlorite with sodium hypochlorite and hydrochloric acid is an aqueous stream of chlorine dioxide which also contains some sodium chloride. Essentially no chlorine, however, is present.

The absence of chlorine is achieved by reacting the sodium chlorite in a medium made acidic, e.g., down to about a pH of about 2.7 to 3.5, by the addition of an inorganic acid such as hydrochloric acid or sulfuric acid, and by adding only a stoichiometric amount of sodium hypochlorite. Thus, little free chlorine is produced since the sodium chlorite would react therewith, and there is no excess hypochlorite to revert to chlorine.

The reaction employed to generate the aqueous stream of chlorine dioxide is generally monitored to insure that the aqueous product stream contains chlorine dioxide in a concentration of about 6,000 mgs per liter or less. This concentration is selected as the maximum concentration for reasons of safety.

More specifically, chlorine dioxide is a gas at normal temperatures that is soluble in water. Water containing chlorine dioxide gives off chlorine dioxide gas until the space above the water phase is at an equilibrium concentration. Generally, chlorine dioxide solutions are not explosive. However, chlorine dioxide vapor in air at certain concentrations is explosive. If a solution is sufficiently concentrated, the vapor space above the solution will develop an explosive concentration of chlorine dioxide. This explosive limit decreases with increasing pressure and increases in a vacuum.

Low concentrations of chlorine dioxide in water will not create an explosive atmosphere, e.g., a 5 percent by volume concentration of chlorine dioxide in air is not explosive at atmospheric pressure. At a concentration of 10 percent, chlorine dioxide will be moderately explosive. It may pop with the formation of a white cloud. At intermediate concentrations in air of from 10 percent to 20 percent, however, chlorine dioxide will have increasingly greater explosive tendencies. Moreover, a spark is not needed to set off the explosion. Sharp edges on metals, the rays of sun, and other effects can initiate the chain reaction. For all practical purposes it can be said that the explosion is spontaneous. The explosive force will increase proportionally to the concentration of chlorine dioxide up to 20 percent, at which concentration the chlorine dioxide in air will explode spontaneously and violently. The equilibrium aqueous phase that will give a 20 percent concentration by volume in the vapor phase is approximately 15,000 mgms per liter. The table below shows the vapor pressure of chlorine dioxide at equilibrium, assuming atmospheric pressure and a temperature of 20° C., over its aqueous solution:

| VOLUME PERCENT OF ClO$_2$ IN GAS PHASE | WEIGHT OF ClO$_2$ IN GRAMS PER LITER OF SOLUTION |
| --- | --- |
| 1 | 0.90 |
| 3 | 2.70 |
| 5 | 4.30 |
| 7 | 6.15 |
| 10 | 8.80 |
| 11 | 9.70 |
| 12 | 10.55 |
| 13 | 11.5 |
| 14 | 12.3 |
| 15 | 13.2 |
| 16 | 14.2 |

A maximum concentration of chlorine dioxide of about 6000 mgms/liter of solution should therefore be observed in order to maintain a safe level of operation. By observing such a limit on the chlorine dioxide concentration in the aqueous phase, the volume percent of chlorine dioxide in the gas phase of the system is clearly maintained at less than about 7 percent.

The pressure maintained in the system, however, can vary from atmospheric. The pressure can vary from a near vacuum to greater than atmospheric, as would be evident to the skilled artisan.

The aqueous stream of chlorine dioxide is then stripped with an inert gas stream or air stream. Any inert gas can be used, such as for example, nitrogen. For purposes of convenience and practicality, air is the most preferred gas for use in the stripping operation. Air is an inexpensive and available commodity, and therefore its use would render the process very practical. Since the amount of air used and the concentration of stripped chlorine dioxide can be easily and closely monitored and controlled, safety also need not be sacrificed.

The stripping of the aqueous stream of chlorine dioxide is achieved by passing the aqueous stream in contact with the inert gas stream or air stream in countercurrent fashion. Preferably, the concentration of chlorine dioxide in the resulting gaseous stream does not exceed about 7 volume percent, and most preferably about 5 volume percent. It is important for the sake of efficiency and control that the stripping procedure be employed in a countercurrent fashion.

Generally, the gas is introduced into the lower section of a stripping column, with the aqueous stream of chlorine dioxide being introduced in the upper section of the stripping column. The gas passes up through the stripper and contacts the chlorine dioxide from the aqueous stream, which passes downwardly through the stripper. If desired, the stripper column can be a packed column for more intimate contact/control of the stripping operation. Through the contacting, the chlorine dioxide contained in the aqueous stream is stripped by the inert gas or air stream.

Resulting from the stripping operation are two streams. One is an aqueous stream which is collected at the bottom of the stripping column. The other is a gaseous chlorine dioxide containing stream, which is collected at the top of the stripping column. If the original aqueous stream is prepared by reacting chlorite with hypochlorite and acid, the gaseous stream containing chlorine dioxide is "clean", i.e., essentially free of any chlorine, acid, chlorite ion or inorganic salt, and is therefore useful for many different applications, such as the deodorization or decolorization of organic materials, or in the treatment of water. The product gas stream containing chlorine dioxide can be used immediately, on site. One preferred use of the resulting clean gaseous stream of chlorine dioxide is for the decolorization and deodorization of a composition of fats and oils, which composition generally contains many fatty acids and fatty acid esters. Contacting the fatty composition with the gaseous stream of chlorine dioxide effectively and efficiently decolorizes and deodorizes the composition.

The overall process of the present invention can be practiced batchwise or continuously. It is preferred that the process of generating the gaseous stream of chlorine dioxide be run as a continuous process.

Turning now to FIG. 1 of the Drawing, there is schematically depicted a system in accordance with the present invention. The system utilizes sodium chlorite (25% concentration), sodium hypochlorite (15% concentration) and hydrochloric acid (10% concentration). If desired, sulfuric acid may be used in place of the hydrochloric acid. The sodium chlorite, sodium hypochlorite and hydrochloric acid are charged, respectively, through lines 1, 2 and 3, with the three reactants then being reacted in the reaction chamber 4. Upon completion of the reaction, the aqueous solution is charged via line 5 into the stripper column 6.

The reaction can be conducted under conventional conditions of temperature and pressure in order to yield the chlorine dioxide product desired. The reactor column 4 preferably provides sufficient retention time to provide high yields of chlorine dioxide. If desired, controls can be utilized to monitor the quality of the product solution, with appropriate adjustments being made accordingly. For example, the product solution can be viewed through a site glass 7. A colorimeter can be used at the site glass to monitor the concentration of chlorine dioxide in the product solution. As well, a pH meter can be incorporated into the product line in order to monitor the pH. If the pH of the product solution is not within a predetermined pH range, then appropriate adjustments can be made with regard to reactant charge, etc.

The resulting product solution is charged into the top of the stripper column 6. Or, the chlorine dioxide aqueous solution can also be recirculated through a standpipe 13. In the latter case, dilution water is added to the recirculation loop and an equal volume of chlorine dioxide solution is charged into the top of the stripper column 6.

The product solution then passes downwardly through the stripper, with the remaining liquid being recovered and removed from the stripper via line 8. The discharge of the stripper is sent to a drain via line 8 when a standpipe is used. Air (or an inert gas) is charged to the stripper column via line 9, with the introduction of the air, or suitable inert gas, being at the bottom of the stripper column. The gas then rises through the stripper column, with a gaseous stream being collected and removed from the stripper via line 10. Thus, countercurrent contacting is established between the product solution charged into the top of the stripper column and the stripper gas charged into the bottom of the stripper column via line 9. The gaseous stream removed via line 10 is the chlorine dioxide containing gas, with the chlorine dioxide having been stripped from the aqueous product solution introduced through line 5.

The amount of air or inert gas introduced into the stripper can be controlled in order to achieve maximum stripping of the chlorine dioxide in solution. For example, if the amount of chlorine dioxide to be charged to the stripper column 6 is predetermined to be 48 pounds per day, at a concentration of 4000 ppm and the concentration or amount of chlorine dioxide to be contained in the product gaseous stream removed via line 10 is desired to be about 5 volume percent, then the amount of air to be utilized can be calculated to be about 3.35 cubic feet per minute. The calculation proceeds as follows:

At 0° C. and 760 mm pressure, an ideal gas occupies 359 cubic feet per pound-mol.

The molecular weight of chlorine dioxide is 67.46.

The average molecular weight of air is 28.80.

At 20° C. and 2 psig pressure, the volume of a pound-mol of gas would be as follows:

$$359 \times (293.15/273.15) \times (14.7/16.7) = 339.14$$

If a gas volume of 339.14 cubic feet contains 5 volume percent chlorine dioxide, then

|       | ft$^3$ | mw    | lb    |
|-------|--------|-------|-------|
| ClO$_2$ | 16.96  | 67.46 | 3.37  |
| Air   | 322.19 | 28.8  | 27.36 |
| Total | 339.15 |       | 30.73 lb/339.14 ft$^3$ |

Based upon the foregoing information, the air utilization at 48 pounds per day of chlorine dioxide and a solution concentration of 4000 ppm would be $$(((48/24)/3.37) \times 339.14)/60 = 3.35 \text{ cubic feet per minute.}$$

The concentration of chlorine dioxide within the product gaseous stream can be monitored by conventional means. For example, the gaseous stream can be viewed through a site glass 11 to which a colorimeter is connected.

Once the product gaseous stream has been obtained, it is transported via line 10 to the on site process in which the chlorine dioxide gaseous stream is applied, 12. One extraordinary application for the gaseous stream of chlorine dioxide is the decolorization and deodorization of fats and oils. Contacting the fats and oils with the chlorine dioxide containing gaseous stream significantly reduces the color and odor associated with such a composition.

Figure 2:
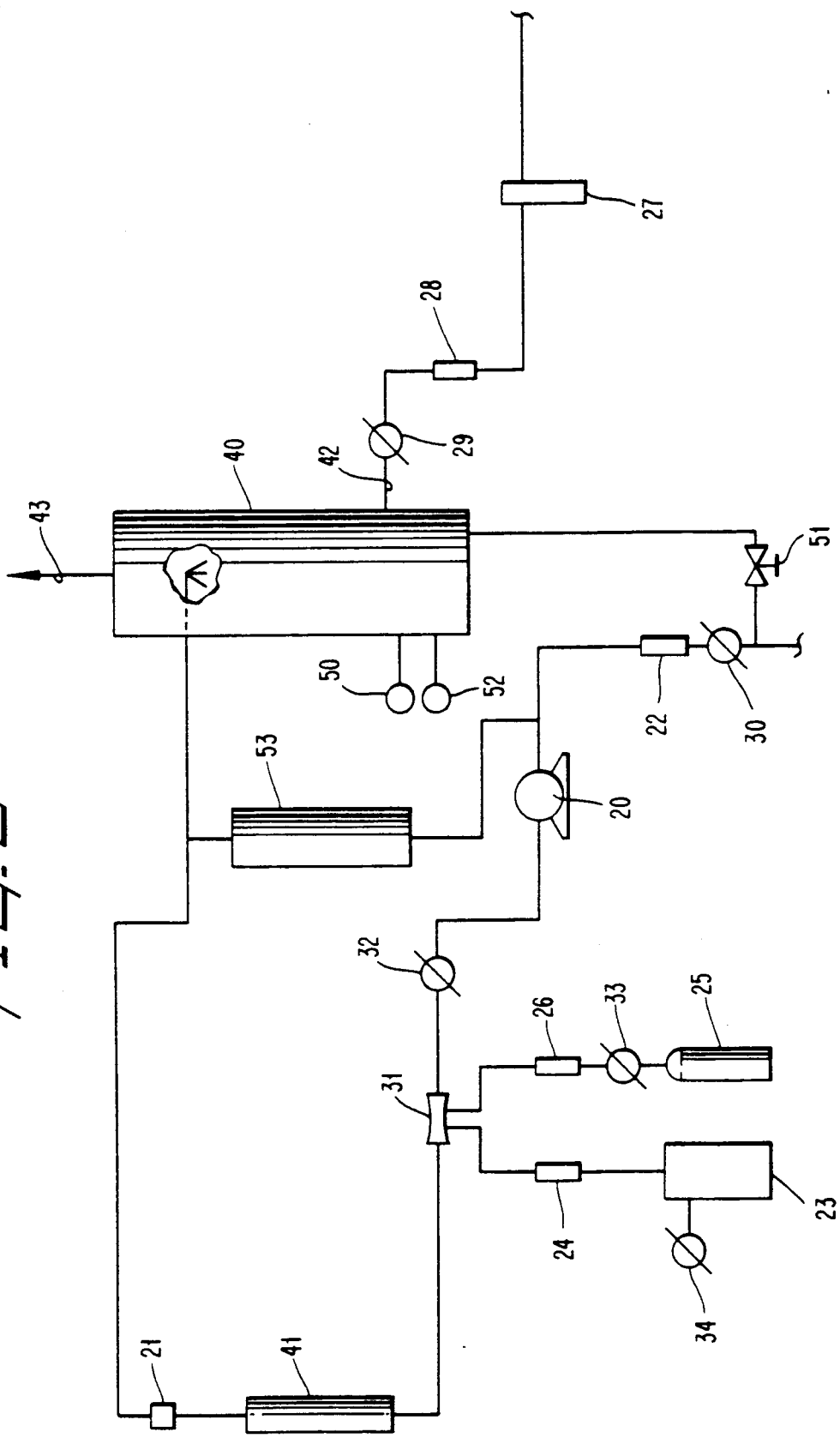
FIG. 2 of the Drawing schematically depicts a system useful in the practice of the present invention wherein chlorine gas is used as a reactant in the generation of an aqueous stream chlorine dioxide.

FIG. 2 of the Drawing depicts a system in accordance with the present invention wherein chlorine gas is utilized as one of the reactants for generating an aqueous stream of chlorine dioxide. A volume of water is circulated throughout the system and standpipe by the booster/recirculation pump 20. The volume of water is circulated long enough to achieve the desired concentration of chlorine dioxide, e.g., about 4,000 ppm in the aqueous solution. The volume of dilution water is adjusted to give the desired flow to the stripper 40, which adjustment is made by a valve 22.

The chlorine gas is maintained in tank 25, and its feed is controlled by valve 26. The feed of the sodium chlorite reactant 23 is adjusted and controlled by valve 24. Both reactants are fed to eductor 31, and are then fed together to the reaction chamber 41. The amount of chlorine added is adjusted in order to produce a pH of from about 2.7 to about 3.6.

Upon completion of the reaction in the reaction chamber 41, the resultant aqueous solution is recirculated through the standpipe 53. An amount of solution equal to the amount of dilution water is charged to the top of the stripper column 40. The concentration of the chlorine dioxide in the aqueous stream can be determined, for example, by evaluator 21. This evaluator can be, for example, a colorimeter. Color standards give a quick indication of chlorine dioxide concentration. Chlorine dioxide in water gives a characteristic yellow color. The solutions assume an orange or reddish brown cast when concentrated. Periodic laboratory testing or analysis might also be accomplished through the use of appropriate equipment.

Upon charging the aqueous chlorine dioxide solution into the top of the stripper column 40, the aqueous solution passes downwardly through the stripper. Air (or an inert gas) is charged into the stripper column via line 42, which introduces the air at the bottom of the column. The gas rises through the stripper column, with the gaseous stream being collected and removed from the stripper via line 43. If desired column can be packed with inert packing such as raschig rings or berl saddles.

Column 40 essentially serves as a gas-liquid contactor, with countercurrent contacting being established between the product aqueous solution charged into the top of the stripper column and the stripper gas charged into the bottom of the stripper column via line 42. The gaseous stream removed via line 43 is the chlorine dioxide containing gas, with the chlorine dioxide having been stripped from the aqueous product solution introduced into the top of the stripper.

Once the product gaseous stream has been obtained, it can be transported to an on site process in which the chlorine dioxide gaseous stream is appropriately used. As mentioned previously, one extraordinary application for the gaseous stream of chlorine is for the decolorization and deodorization of fats and oils.

Safety interlocks are also preferably employed in the system of the present invention. These interlocks can simply be monitors which monitor the volume of materials or pressure in any particular chamber or line. Such safety interlocks can shut down and purge the system if any undesired, e.g., dangerous, condition is sensed.

For example, in the system depicted in FIG. 2, the system will shut down and purge, with an alarm being activated, if one of the following conditions is determined to exist:

low air flow to the stripper column 40 as determined by safety interlock 29;

low dilution water flow as determined by safety interlock 30;

high concentration of chlorine dioxide in the recirculation loop as determined by monitor 21;

low pressure to the eductor as determined by monitor 32;

loss of chlorine gas supply as determined by safety interlock monitor 33;

loss of chlorite liquid supplies determined by safety interlock monitor 34.

The system depicted in FIG. 2 can most advantageously be employed as a once-through system. Such a system would generally employ a 4,000 ppm solution of chlorine dioxide, with only one pass through the eductor. This reduces the possibility of producing a concentration of chlorine dioxide solution that is too high by only exposing the water to the generation process once. An additional advantage is the ability to recirculate the effluent of the stripper through the generator to thereby greatly reduce the water requirement.

In such a once-through system, it is preferred that a level control 50 is intimately connected with the stripper column 40 sump. The level control would activate valve 51 to provide makeup water to the system in order to replace water loss in the stripping process.

In addition to the previously mentioned safety interlocks, an additional safety interlock which is preferred for a once-through system would be a low sump level alarm 52, which detects low water volume in the system.

While the invention has been described with preferred embodiments, it is to be understood that variations and modifications may be resorted to as will be apparent to those skilled in the art. Such variations and modifications are to be considered within the purview and the scope of the claims appended hereto.

What is claimed:

1. A process for producing a gaseous stream of chlorine dioxide useful in the treatment of water comprising
    (a) providing an aqueous stream of chlorine dioxide, wherein the aqueous stream of chlorine dioxide is obtained by reacting an alkali metal chloride with chlorine, and
    (b) contacting the aqueous stream of chlorine dioxide in countercurrent fashion with a stream consisting essentially of an inert gas or air to strip chlorine dioxide from the aqueous stream and thereby produce a gaseous stream of chlorine dioxide.

2. The process of claim 1, wherein the aqueous stream of chlorine dioxide provided in (a) contains up to about 6,000 mgms per liter of chlorine dioxide.

3. The process of claim 1, wherein the gaseous stream of chlorine dioxide produced in (b) contains about 7 percent or less by volume chlorine dioxide.

4. The process of claim 3, wherein the gaseous stream of chlorine dioxide contains about 5 volume percent or less chlorine dioxide.

5. The process of claim 2, wherein the gaseous stream of chlorine dioxide produced in (b) contains about 7 percent or less by volume chlorine dioxide.

6. The process of claim 1, wherein an air stream is used for the countercurrent contacting.

7. The process of claim 1, wherein the process is run continuously.

8. The process of claim 1, wherein recirculation is achieved by using a standpipe.

9. The process of claim 1, wherein the process is practiced using a once-through system.

* * * * *